United States Patent [19]

Ezzat et al.

[11] Patent Number: 5,778,442
[45] Date of Patent: Jul. 7, 1998

[54] METHOD AND APPARATUS FOR BUFFERING DATA IN A COMPUTER SYSTEM

[75] Inventors: Ahmed Ezzat, Cupertino; Juan R. Loaiza, San Carlos, both of Calif.

[73] Assignee: Oracle Corporation, Redwood Shores, Calif.

[21] Appl. No.: 621,655

[22] Filed: Mar. 25, 1996

[51] Int. Cl.$^6$ ................................................ C06F 13/00
[52] U.S. Cl. .................... 711/159; 711/133; 711/136; 711/160; 395/574; 395/876; 364/DIG. 1
[58] Field of Search ........................... 395/460, 463, 395/486, 487, 874, 876

[56] References Cited

U.S. PATENT DOCUMENTS 4,802,086  1/1989  Gay et al. ........................ 395/460
5,530,850  6/1996  Ford et al. ........................ 395/600
5,619,675  4/1997  De Martine et al. ................ 395/460

*Primary Examiner*—Frank J. Asta
*Attorney, Agent, or Firm*—Lowe, Price, LeBlanc & Becker

[57] ABSTRACT

A method and apparatus for replacing data in a list of buffers is provided. The list of buffers has a hot end and a cold end. The buffers at the hot end are maintained in a FIFO list and the buffers at the cold end are maintained in an LRU list. Requested data is located and, if the requested data is located in the LRU portion of the buffer list, the buffer containing the requested data is moved to the head of the FIFO list. If the data is located in a buffer in the FIFO portion of the buffer list, no rearrangement is required. If the requested data is not located in the buffer list, the data is stored into the buffer at the tail end of the LRU list, then the buffer is moved to the head of the FIFO list.

20 Claims, 5 Drawing Sheets

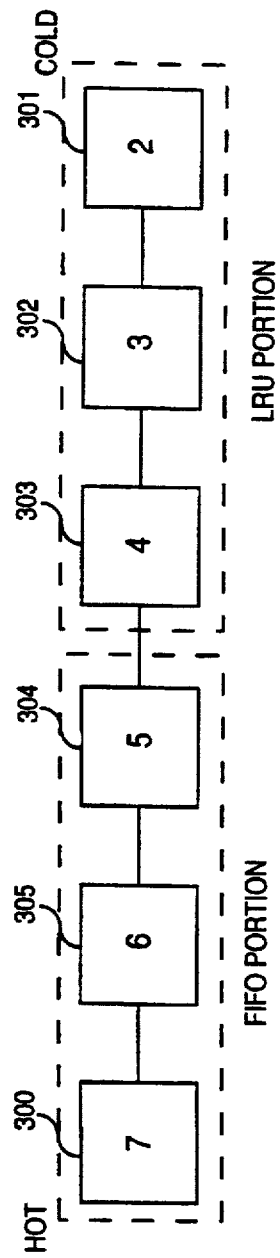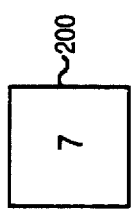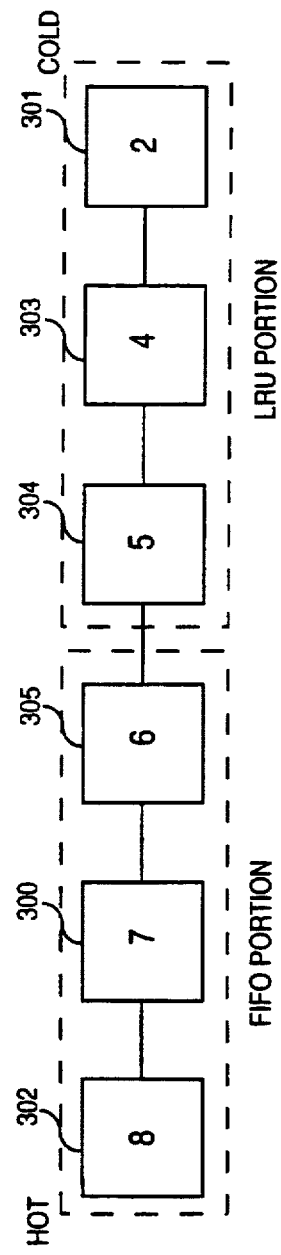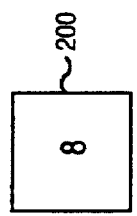
Fig. 6
Fig. 7

METHOD AND APPARATUS FOR BUFFERING DATA IN A COMPUTER SYSTEM

FIELD OF THE INVENTION

The present invention relates to replacement of buffered data in computer systems, and more specifically, to a method and apparatus for reduced overhead for replacement of buffered data in computer systems.

BACKGROUND OF THE INVENTION

Computer systems have limited storage for the information they are used to process. Often, the amount of information to be processed exceeds the amount of storage available to hold the information. Therefore, buffering systems, such as caches, have been developed which allow only a subset of the information to be stored at any given time in the cache. Once the cache is full, storing new data in the cache requires replacing data that already resides in the cache.

Many replacement strategies have been developed. The most common of these strategies include replacing the least recently used (LRU) data, replacing the most frequently used (MFU) data, replacing the oldest placed in the buffer (First-In/First-Out, or FIFO), or replacing the newest data in the buffer (Last-In/First-Out, or LIFO). Each of these methods has advantages and disadvantages.

A wide range of applications, especially in the operating system and database fields, tend to use the LRU replacement strategy. A common implementation of LRU is to structure the cache as a doubly-linked list of buffers and maintain the list of buffers according to the time at which the data contained therein is accessed. To illustrate by example, assume one end of the list is a buffer containing the most recently used (hot-end) data. At the other end is a buffer containing the least recently used (cold-end) data. When data in a given buffer is accessed, the buffer containing the data is moved from its current location in the list to the hot end of the list. When new data is brought into the cache, it is placed in the buffer at the cold end of the list (least recently used buffer). Given that the data placed in the buffer will be accessed and to prevent that buffer from being reused immediately, the buffer is moved from the cold end to the hot end of the list.

One disadvantage of this approach is that a considerable amount of overhead is required to rearrange the list each time data is accessed. Computer programs tend to have "locality of reference," meaning that data recently accessed is likely to be accessed again in the near future. Consequently, buffers in the hot portion of the list do not progress very far toward the cold end before the buffers are moved back to the hot end of the list. Thus, buffers near the hot end of the list tend to be rearranged and stay near the hot end of the list. The net result is that buffers are often moved within the list without any benefits being gained because no data is actually being replaced.

A desirable solution would provide a replacement strategy having the LRU functionality with reduced overhead required to maintain the buffer list. Such a solution would improve the performance by not using valuable processing resources to rearrange the list or acquiring locks every time data in one of the buffers in the list is accessed.

SUMMARY OF THE INVENTION

A method and apparatus for replacing data in a list of buffers is disclosed. This replacement strategy approximates LRU but with reduced overhead, hence the replacement strategy is called Light Least Recently Used (LLRU). A buffer list is maintained using two replacement strategies: A portion of the buffers starting from the hot end is maintained as a first in/first out (FIFO) sublist and the remaining portion of the list is maintained as a least recently used (LRU) sublist. When accessing the data, there is no distinction of where the buffer is located. On the other hand, as far as replacement is concerned buffers are moved to the hot end only if they were located in the LRU portion of the list. The exact division of buffers between the FIFO and LRU portions can be either static or dynamic.

If the desired data is not in the buffer list, the behavior is similar to the traditional LRU, i.e., read the data into the buffer at the cold end of the LRU sublist and then move that buffer to the hot end of the FIFO sublist. If the desired data was located in a buffer in the LRU sublist, the buffer is moved to the hot end of the FIFO sublist. Otherwise, the data is located in a buffer in the FIFO sublist, in which case the buffer is not moved. In summary, if the buffer is located in what is perceived as the hot region (the FIFO sublist), the buffer is not moved. A buffer is only moved if it is in the cold region (the LRU sublist). Given that most of the accesses and as a result the buffer movements happen at the hot region, the net effect of this LLRU replacement strategy is to eliminate many buffer movements while approximating the overall traditional LRU behavior.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is the list of FIG. 5 after new data has been added to the list.

FIG. 7 is the list of FIG. 6 after a buffer in the LRU portion of the list has been accessed.

DETAILED DESCRIPTION OF THE PREFERRED EMBODIMENT

A method and apparatus for data replacement in a computer system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
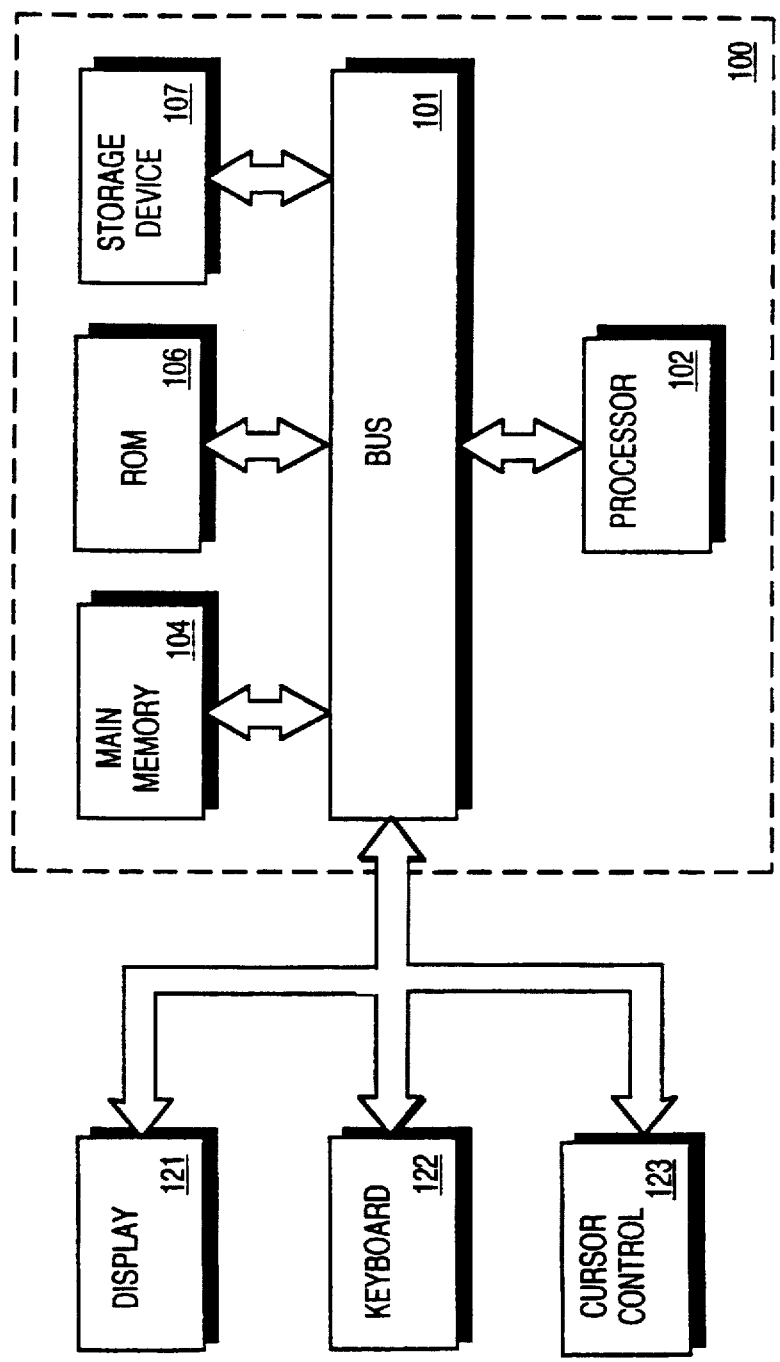
FIG. 1 is a computer system upon which the preferred embodiment of the present invention can be implemented.

The preferred embodiment of the present invention can be implemented in many computer architectures such as Single-Instruction-Single-Data (SISD) systems, or Multiple-Instruction-Multiple-Data (MIMD) systems. For illustration, FIG. 1, depicts an SISD system and referred to as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disc and its corresponding drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

Figure 2:
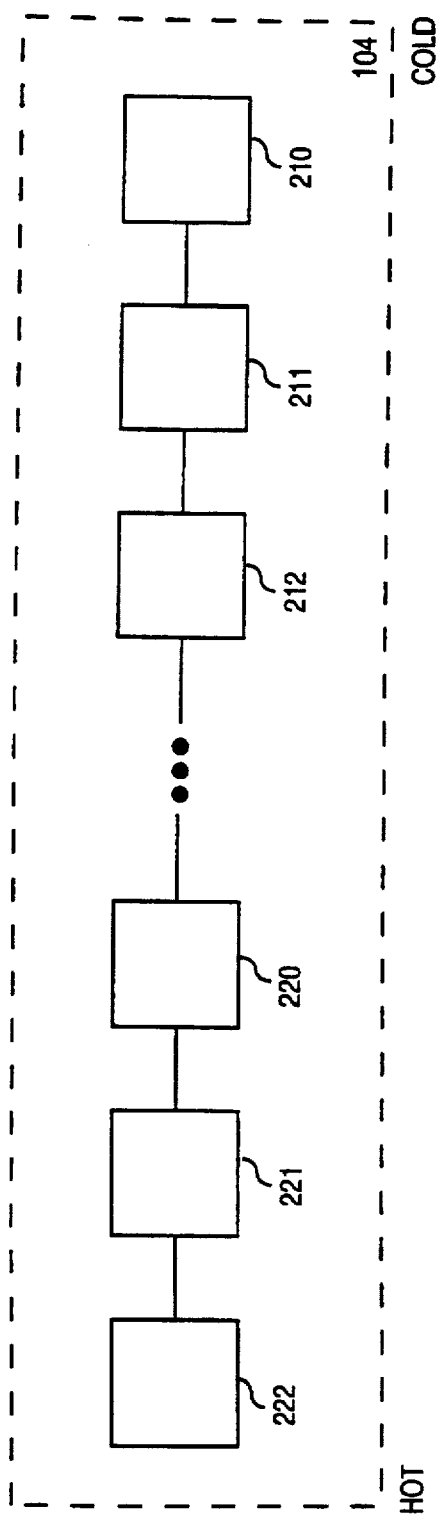
FIG. 2 is a list of buffers maintained in main memory of the computer system of FIG. 1.

The present invention is related to the use of computer system such as 100 to buffer data that is accessed by processor 102 while computer system 100 is executing a program. As computer system 100 executes a program, it may maintain data in a list of buffers within main memory 104. Main memory 104 is shown in FIG. 2 as containing a list of buffers 210–222. When all of the buffers in the list contain useful data and new data is requested, data in one of the buffers in the list must be replaced by the incoming data.

A commonly used algorithm to select a buffer to be reused for incoming data is called the least recently used (LRU) algorithm. As an example, using the LRU replacement strategy, with buffer 210 as coldest and buffer 222 as hottest, buffer 210 will be selected for reading the new incoming data in the buffer list. In order to maintain coldest buffer in the list at one end and the hottest buffer at the other end as shown in FIG. 2, the replacement strategy requires every time a buffer is accessed from the list to be physically moved from its current position to the hot end of the list.

The LRU replacement strategy has desirable behavior for many applications, however, it suffers from high overhead incurred as a result of buffer movement every time a buffer is accessed. The present invention incorporates a modified LRU replacement strategy that approximates LRU behavior, but requires fewer buffer movements. Because of the reduced overhead, the replacement strategy may be referred to as light LRU (LLRU).

Figure 3:
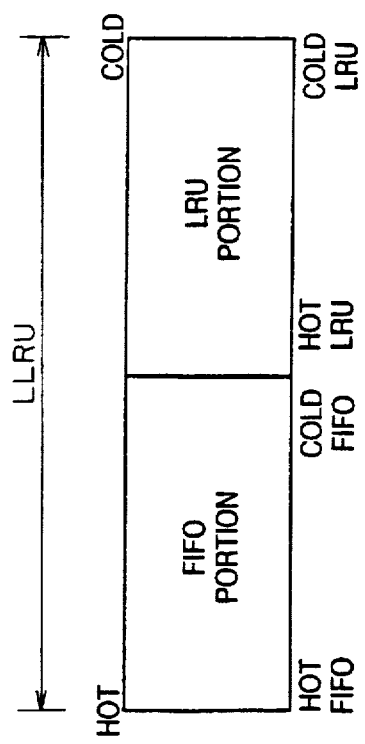
FIG. 3 is the general format of a storage space containing the list of buffers.

According to one embodiment of the present invention incorporating the LLRU replacement strategy, a portion of the buffer list is maintained as an LRU list and the remaining portion of the buffer list is maintained as a FIFO list. This general arrangement is shown in FIG. 3. According to one embodiment, the two portions are of equal size. However, the size ratio between the two portions may vary from implementation to implementation. For simplicity, the following description assumes the two portions are of equal size.

The portion at the hot end of the buffer list is maintained as a FIFO list and the portion at the cold end is maintained as an LRU list. Each of the two portions has its own hot and cold end. The hot end of the LRU list corresponds to the cold end of the FIFO list. The buffers in the FIFO list are not rearranged when a buffer in the FIFO portion is accessed. However, the list is rearranged when buffers in the LRU portion of the list are accessed. Specifically, when data is accessed from a buffer in the LRU portion, the buffer containing the requested data is moved to the hot end of the FIFO portion and the buffer at the cold end of the FIFO list portion becomes part of the LRU portion. When data is requested that is not contained in either portion of the buffer list, the requested data is read into the buffer at the cold end of the LRU portion, the buffer is then moved to the hot end of the FIFO portion. The buffer at the cold end of the FIFO portion is moved to the hot end of the LRU list.

Figure 4:
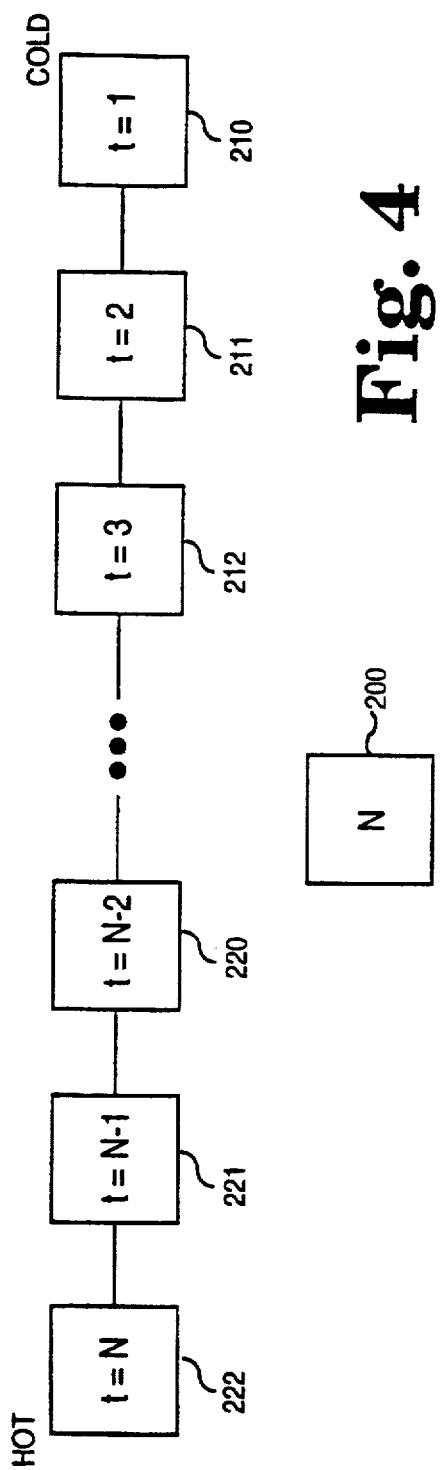
FIG. 4 is a list of buffers maintained according to the teachings of the present invention.

FIG. 4 shows the list of buffers in an initial condition. Counter 200 initially is set to the number of buffers in the list. FIG. 4 shows this value as "N." Each of the buffers in the list have a temperature value (t) associated with them. Initial values are shown in FIG. 4. Buffer 210 at the cold end of the array of buffers has a temperature value of 1. The temperature values increase continuously to the hot end of the buffer list. Buffer 222 at the hot end of the buffer list has a temperature value of "N."

Figure 5:
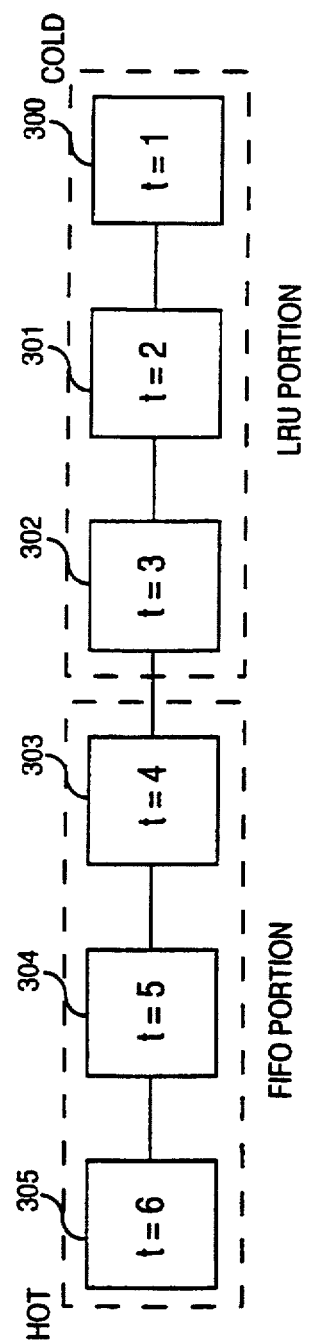
FIG. 5 is a 6-buffer list maintained according to the teachings of the present invention.

FIG. 5 shows an exemplary buffer list containing six buffers 300–305. Counter 200 initially contains the value "6" because the buffer list contains six buffers. The number shown in each buffer is the temperature value associated with each buffer. The buffer with the highest temperature value (6) is at the hot end of the list and the buffer with the lowest temperature value (1) is at the cold end of the list. The temperature value is used to determine whether the requested data is in the FIFO portion or the LRU portion of the buffer list. It is important to note that while buffers are ordered according to a continuous temperature values initially, once data has been replaced the temperature values are continuous only in the FIFO portion and are not necessarily continuous in the LRU portion of the list, as will be illustrated in greater detail below.

When a specific buffer is accessed, a simple formula is used to determine whether that the buffer is physically in the FIFO or LRU portion of the buffer list. The temperature value associated with that buffer is compared to the counter value less the number of buffers in the FIFO portion. If the buffer's temperature is greater than the counter less the number of buffers in the FIFO portion, then the buffer is in the FIFO portion of the list and no movement is required. Otherwise, the buffer is in the LRU portion of the list. Symbolically, if (temperature)>(counter−# of buffers in the FIFO portion) then the buffer containing the requested data is located in the LRU portion. If the requested buffer is located in the LRU portion of the list, it is moved to the hot end of the FIFO list. When a buffer is moved, the counter value is incremented by one and the temperature of the buffer assigned to the hot end of the list of buffers is set equal to the new counter value.

It should be noted that the equation above is merely exemplary. Other equations may be used. For example, a buffer is in the FIFO portion if the counter value minus the number of buffers in the FIFO portion is less than the index value of the buffer. Therefore, the present invention is not limited to the use of any one equation.

Referring again to FIG. 5, when new data is brought into the buffer list, the new data is placed in the buffer at the cold end of the buffer list (buffer 300) and the data that was contained therein is removed or overwritten. Because the new data is now the most recently used data and the buffer 300 in which the data was stored is not already present in the FIFO portion, buffer 300 is placed at the hot end of the buffer list. When placing a buffer at the hot end of the buffer list counter 200 is incremented by one and the temperature value associated with buffer 300 is assigned the new value of counter 200. FIG. 6 illustrates the buffer list after such a replacement operation has been performed. Note that buffer 303 is now at the hot end of the LRU portion and buffer 301 is at the cold end of the buffer list.

FIG. 7 shows the buffer list of FIG. 6 after the buffers have been rearranged in response to a request for data currently stored in buffer 302 in the LRU portion of the list. In this exemplary access, data from buffer 302 (temperature of "3") is requested. Comparing the buffer's temperature (3) with the counter less the number of buffers in the FIFO portion of the list of buffers (7−3=4) indicates that the buffer is in the LRU portion of the list (3<4). As a result, buffer 302 is moved to the hot end of the FIFO portion. However, unlike the access shown in FIG. 6, no data must be replaced because no new data is brought into the buffer list. Counter 200 is incremented and the temperature value of buffer 302 is set equal to the new value of counter 200. Note that buffer 301 remains at the cold end of the buffer list. Also, buffer 304 becomes part of the LRU list.

Figure 8:
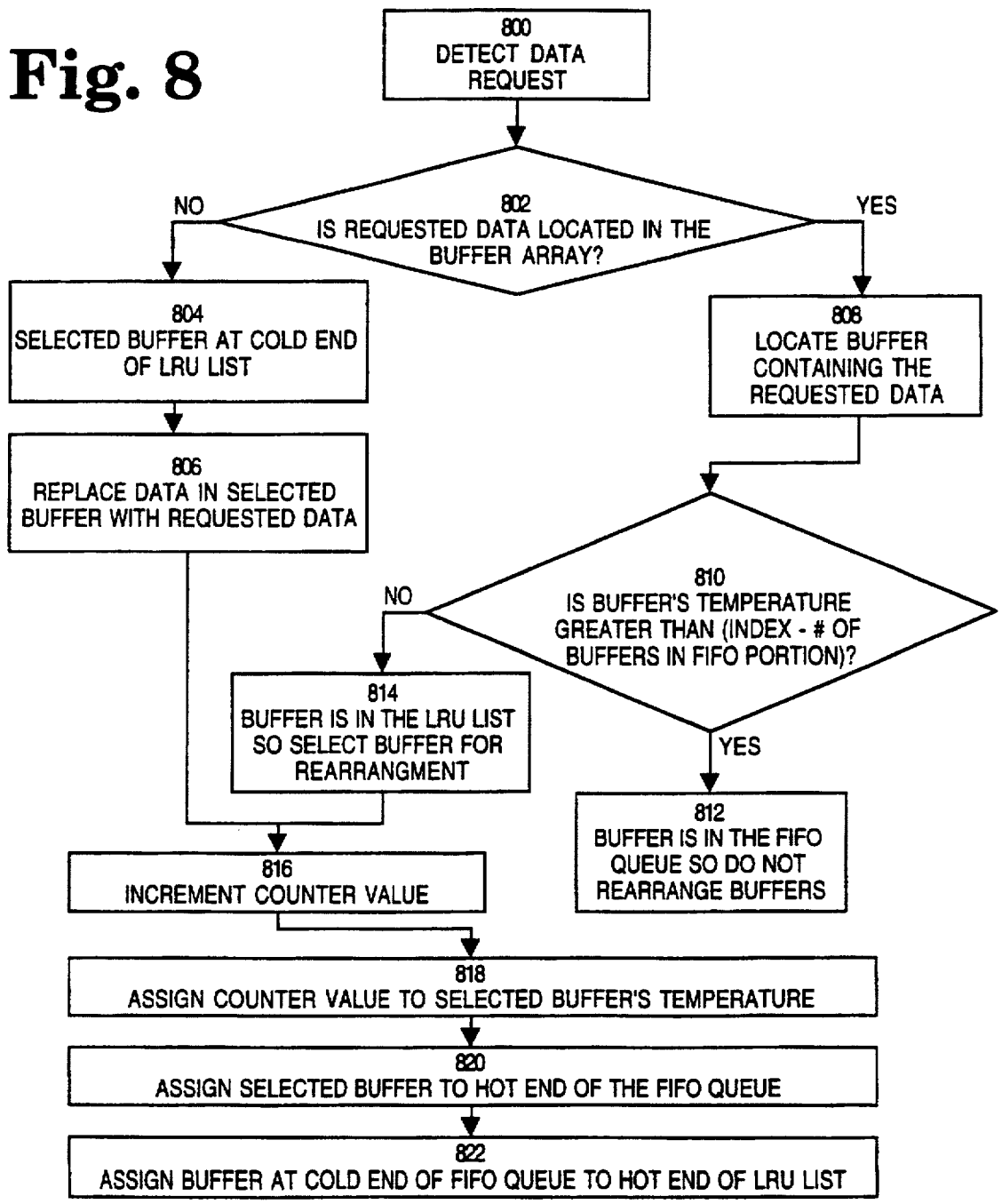
FIG. 8 is a flow chart illustrating the steps performed in response to a data request according to an embodiment of the invention.

FIG. 8 is a flow chart illustrating the steps performed in response to a data request according to an embodiment of the present invention. In step 800 a data request is detected. In step 802, it is determined whether the requested data is located in the buffer list. If the data is located in the buffer list, the buffer containing the requested data is located in step 808. The next step (step 810) is to determine whether the buffer's temperature is greater than the counter less the number of buffers in the FIFO portion. If so, the requested data is in the FIFO portion and the buffer is not moved (step 812). Otherwise, in step 814, the buffer is in the LRU portion and is selected for rearrangement.

When rearrangement is required, the counter value is incremented by one in step 816. The counter value is then assigned to the selected buffer's temperature in step 818 and the selected buffer is moved to the hot end of the FIFO portion in step 820. The buffer at the cold end of the FIFO portion is then moved to the hot end of the LRU portion in step 822.

Returning now to step 802, if the requested data is not located in the buffer list, the buffer at the cold end of the LRU portion is selected for rearrangement in step 804. The data in the selected buffer is replaced with the requested data in step 806. Replacement steps 816–822 are then taken to complete the rearrangement process.

As mentioned above, hot buffers in a traditional LRU list are rearranged often even when no data is being replaced. By utilizing the teachings of the present invention, the data in the hot end (FIFO portion) of the list can be accessed often without any rearrangement of buffers. Thus, the present invention provides approximate traditional LRU replacement strategy with reduced overhead.

Due to the fact that counter 200 will have a finite precision, counter 200 will eventually reach its maximum value. When counter 200 is incremented after reaching its maximum value, it overflows and becomes 0. Any number of well-known overflow handling techniques may be used to ensure that the replacement mechanism continues to function properly when such an overflow condition occurs. The present invention is not limited to any particular type of overflow handling technique.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for replacing data in a list of buffers, the method comprising the steps of:

locating requested data;

if said requested data is located in a buffer that belongs to a first set of buffers in said list of buffers, then accessing said requested data without rearranging any buffers in said list of buffers;

if said requested data is located in a buffer that belongs to a second set of buffers in said list of buffers, then performing the steps of assigning the buffer that contains said requested data to said first set of buffers, and assigning a buffer in said first set of buffers to said second set of buffers.

2. The method of claim 1 further comprising the steps of:

if said requested data is not located in any buffer of said list of buffers, then performing the steps of assigning said requested data to a given buffer in said second set of buffers, assigning said given buffer to said first set of buffers, and assigning a buffer in said first set of buffers to said second set of buffers.

3. The method of claim 1 further comprising the steps of:

associating with each buffer in said list of buffers a recency value, said recency value indicating the order that said buffer is assigned to the first set of buffers relative to other buffers in said list of buffers; and if said requested data is located in a buffer of said list of buffers, then determining whether said buffer that contains said requested data is in said first set of buffers or said second set of buffers based on the recency value associated with said buffer that contains said requested data.

4. The method of claim 3 further comprising the step of:

if the requested data resides in a buffer in said second set of buffers, then updating the recency value associated with the buffer that contains the requested data in response to assigning the buffer that contains said requested data to said first set of buffers.

5. The method of claim 4 wherein
the method further comprises the step of storing a first value; and
the step of updating the recency value associated with the buffer that contains the requested data includes the steps of incrementing the first value; and
setting to the first value the recency value associated with the buffer that contains the requested data.

6. The method of claim 5 wherein the step of determining whether said buffer that contains said requested data is in said first set of buffers or said second set of buffers comprises the steps of:
generating a second value based on the first value;
performing a comparison of said second value and the recency value associated with said buffer that contains said requested data; and
determining whether said buffer that contains said requested data is in said first set of buffers or said second set of buffers based on said comparison.

7. The method of claim 6 wherein:
the step of generating a second value based on the first value includes subtracting the number of buffers in said first set of buffers from said first value; and
the step of determining whether said buffer that contains said requested data is in said first set of buffers or said second set of buffers based on said comparison includes determining that said buffer that contains said requested data is in said first set of buffers if said second value is less than the recency value; and
determining that said buffer that contains said requested data is in said second set of buffers if said second value is not less than the buffer's recency value.

8. The method of claim 5 further comprising the step of:
if said requested data is not located in any buffer in said list of buffers, then performing the steps of:
selecting a given buffer from said second set of buffers;
storing said requested data in said given buffer;
incrementing the first value;
setting the index value associated with the given buffer to the first value;
adding the given buffer to the first set of buffers; and
assigning a buffer from said first set of buffers to said second set of buffers.

9. The method of claim 8 further comprising the steps of
maintaining said first set of buffers in a first in/first out (FIFO) list that has a head end and a tail end;
maintaining said second set of buffers in a least recently used (LRU) list that has a head end and a tail end;
wherein the step of selecting a buffer from said second set of buffers includes selecting a buffer at the tail end of the LRU list;
wherein the step of assigning the buffer that contains said requested data to said first set of buffers includes adding the buffer that contains said requested data to the head end of the FIFO list; and
wherein the step of assigning a buffer in said first set of buffers to said second set of buffers includes the step of adding a buffer that is located at the tail end of the FIFO list to the head end of the LRU list.

10. The method of claim 1 further comprising the steps of
maintaining said first set of buffers in a first in/first out (FIFO) list that has a head end and a tail end;

maintaining said second set of buffers in a least recently used (LRU) list that has a head end and a tail end; and
wherein the step of assigning the buffer that contains said requested data to said first set of buffers includes adding the buffer that contains said requested data to the head end of the FIFO list, and
wherein the step of assigning a buffer in said first set of buffers to said second set of buffers includes the step of adding the buffer at the tail end of the FIFO list to the head end of the LRU list.

11. A machine-readable medium that has stored thereon sequences of instructions, the sequences of instructions including instructions which, when executed by a processor, cause said processor to perform the steps of:
locating requested data;
if said requested data is located in a buffer that belongs to a first set of buffers of a buffer list, then accessing said requested data without rearranging any buffers in said buffer list;
if said requested data is located in a buffer that belongs to a second set of buffers of said buffer list, then performing the steps of assigning the buffer that contains said requested data to said first set of buffers, and
assigning a buffer in said first set of buffers to said second set of buffers.

12. A method for replacing data in an array of buffers, the method comprising the steps of:
locating requested data;
if said requested data is located in a buffer that belongs to a first-in-first-out (FIFO) list of buffers, then accessing said requested data without rearranging any buffers in said FIFO list of buffers;
if said requested data is located in a buffer that belongs to a least-recently-used (LRU) list of buffers, then performing the steps of
assigning the buffer that contains said requested data to a head end of said FIFO list of buffers, and
assigning a buffer at a tail end of said FIFO list to a head end of said LRU list of buffers.

13. The method of claim 12 further comprising the steps of:
if said requested data is not located in any buffer of either said FIFO list or said LRU list, then performing the steps of
assigning said requested data to a given buffer at a tail end of said LRU list of buffers,
assigning said given buffer to the head end of the FIFO list of buffers, and
assigning a buffer at the tail end of the FIFO list of buffers to the head end of said LRU list of buffers.

14. The method of claim 12 further comprising the steps of:
associating with each buffer in said FIFO list and said LRU list a recency value, said recency value indicating the order that said buffer is assigned to the FIFO list relative to other buffers in said array of buffers; and
if said requested data is located in a buffer that belongs to either said FIFO list or said LRU list, then determining whether said buffer that contains said requested data is in said FIFO list of buffers or said LRU list of buffers based on the index value associated with said buffer that contains said requested data.

15. The method of claim 14 further comprising the step of:
if the requested data resides in a buffer in said LRU list of buffers, then updating the recency value associated with the buffer that contains the requested data in response to assigning the buffer that contains said requested data to the head end of said FIFO list of buffers.

16. The method of claim 15 wherein the method further comprises the step of storing a first value; and the step of updating the recency value associated with the buffer that contains the requested data includes the steps of incrementing the first value; and setting to the first value to the recency value associated with the buffer that contains the requested data.

17. The method of claim 16 wherein the step of determining whether said buffer that contains said requested data is in said FIFO list of buffers or said LRU list of buffers comprises the steps of:

generating a second value based on the first value;

performing a comparison of said second value and the recency value associated with said buffer that contains said requested data; and determining, based on said comparison, whether said buffer that contains said requested data is located in said FIFO list of buffers, or whether said buffer that contains said requested data is located in said LRU list of buffers.

18. The method of claim 17 further comprising the steps of:

generating said second value by subtracting the number of buffers in said FIFO list of buffers from said first value; and determining that said buffer that contains said requested data is in said FIFO list of buffers if said second value is less than the recency value; and determining that said buffer that contains said requested data is in said LRU list of buffers if said second value is not less than the recency value.

19. The method of claim 16 further comprising the step of:

if said requested data is not located in any buffer of said FIFO list or said LRU list, then performing the steps of:

selecting a given buffer at the tail end of said LRU list of buffers;

storing said requested data in said given buffer;

incrementing the first value;

setting the recency value associated with the given buffer to the first value;

adding the given buffer to the head end of the FIFO list of buffers; and assigning a buffer at the tail end of said FIFO list of buffers to the head end of the LRU list of buffers.

20. A computer system comprising:

memory containing a plurality of buffers;

means for maintaining a first set of buffers of said plurality of buffers in a FIFO list that has a head and a tail;

means for maintaining a second set of buffers of said plurality of buffers in a linked list that has a head and a tail;

means for moving a buffer in said link list from said linked list to the head of the FIFO list when data contained in the buffer is accessed;

means for storing data in a buffer at the tail of the linked list and moving the buffer to the head of the FIFO list when data that does not reside in any of said plurality of buffers is accessed; and means for moving the buffer at the tail of the FIFO list to the head of the linked list in response to a buffer being added to the head of the FIFO list.

* * * * *